United States Patent
Bandstra et al.

(10) Patent No.: US 6,948,300 B1
(45) Date of Patent: Sep. 27, 2005

(54) WIDE PICKUP HEADER FOR A ROUND BALER

(75) Inventors: Jerry E. Bandstra, Pella, IA (US); Bradley D. Nelson, Monroe, IA (US)

(73) Assignee: Vermeer Manufacturing Company, Pella, IA (US)

( * ) Notice: Subject to any disclaimer, the term of this patent is extended or adjusted under 35 U.S.C. 154(b) by 0 days.

(21) Appl. No.: 10/630,443

(22) Filed: Jul. 30, 2003

(51) Int. Cl.[7] .................. A01D 39/00; A01D 43/02; A01D 75/00
(52) U.S. Cl. .......................... 56/341; 56/119
(58) Field of Search .................. 56/16.6, 341, 364, 56/343, 344

(56) References Cited

U.S. PATENT DOCUMENTS

| | | | | |
|---|---|---|---|---|
| 3,412,535 A | * | 11/1968 | Drummond | 56/14.4 |
| 4,751,811 A | * | 6/1988 | Groothuis | 56/364 |
| 4,929,904 A | * | 5/1990 | Bohman et al. | 324/696 |
| 5,394,682 A | | 3/1995 | Frimml et al. | 460/122 |
| 5,595,055 A | * | 1/1997 | Horchler et al. | 56/341 |
| 5,848,523 A | * | 12/1998 | Engel et al. | 56/341 |
| 5,979,153 A | * | 11/1999 | Roth | 56/341 |
| 6,029,434 A | * | 2/2000 | Ratzlaff et al. | 56/341 |
| 6,279,304 B1 | * | 8/2001 | Anstey et al. | 56/341 |
| 6,314,708 B1 | * | 11/2001 | Engel | 56/341 |
| 6,601,375 B1 | * | 8/2003 | Grahl et al. | 56/16.6 |
| 6,651,418 B1 | * | 11/2003 | McClure et al. | 56/341 |
| 2004/0011016 A1 | * | 1/2004 | McClure et al. | 56/341 |

FOREIGN PATENT DOCUMENTS

| | | | |
|---|---|---|---|
| EP | 0 064 112 | 11/1984 | |
| GB | 2203687 | 10/1988 | |
| JP | 2003009647 A | * 1/2003 | ........... A01F 15/10 |

* cited by examiner

*Primary Examiner*—Árpád Fábián Kovács
(74) *Attorney, Agent, or Firm*—Sturm & Fix LLP

(57) ABSTRACT

When harvesting forage in the form of a large round bale, for instance, there are times in which a windrow of forage material lies outside the side boundaries of the bale-forming chamber. This may be due to the windrow being made wide by machinery having driven through it, or by wind, or because of the need to turn the forage harvesting equipment tightly. A wide pickup, notably wider than the width of the bale-forming chamber, provides a solution to this common problem. Dual augers at each end of the wide pickup provide the force to direct the forage into a narrower path, to enter the bale-forming chamber. The orientation and size of the augers permits the pickup header to reside in the same location it would if it was not wider than the baler. Tines or teeth of various rigidities and shapes are provided in the pickup for more effective pickup of the forage.

17 Claims, 9 Drawing Sheets

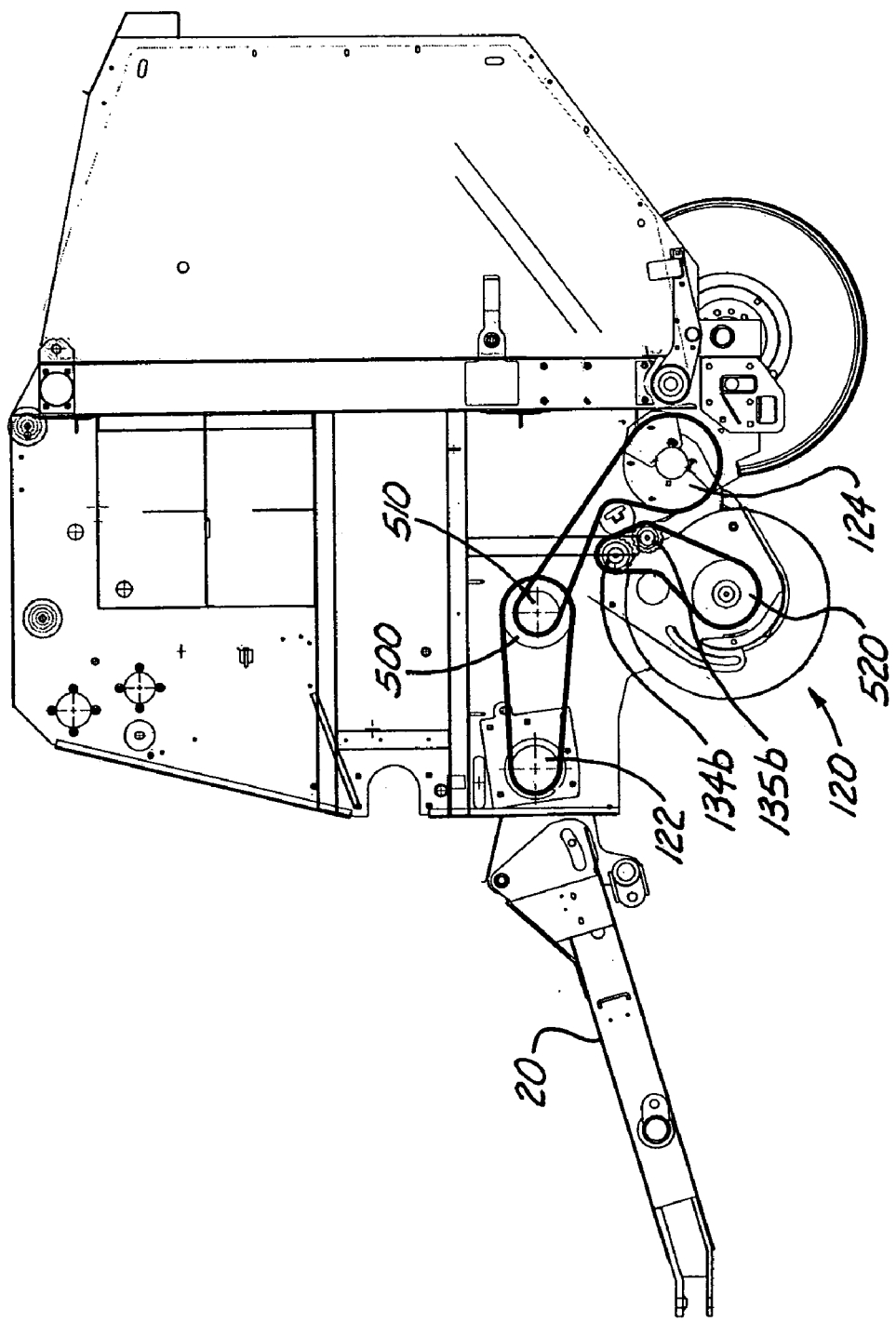

WIDE PICKUP HEADER FOR A ROUND BALER

BACKGROUND OF THE INVENTION

1. Field of the Invention

The present invention relates generally to farm machinery. More particularly the present invention relates to a forage harvesting machine that includes a pickup header that is wider than the bale forming unit, providing the capability to pickup forage in a windrow that lies outside the side-boundaries of the bale forming unit.

2. Background Art

Forage may be harvested with a large round (cylindrical) baler, for instance. Such harvesting equipment, such as large round balers, include a pickup header for lifting the forage off the ground, from the windrow, and directing it into the harvesting equipment. Not infrequently, due to equipment wheels or wind, a windrow may become wider than the processing portion of the harvester, such as the bale-forming chamber of a large round baler. As well, when turning, it may become difficult or impossible to align the pickup header with the existing windrow. In either of these cases, the material outside the side of the processing portion (such as the bale-forming unit of a large round baler) needs to be moved in a direction perpendicular to the windrow, as well as being picked up, in order to be positioned to correctly engage the processing elements.

In a large round baler, the material that is picked-up by the header is transported to the bale forming chamber for processing, for being compacted into a round bale. Many models of round balers are manufactured, typically either fixed chamber balers or variable chamber balers. The fixed chamber balers include a bale forming chamber of a fixed bale diameter, where the material is not significantly compacted until the bale reaches the bale diameter. The variable chamber balers include a bale forming chamber of variable diameter, and the material is compressed as it is formed. Both types typically are mounted on a 2-wheel chassis, to be pulled by a tractor.

The location of the pickup header relative to the bale forming chamber is important for both types of round balers, as minimizing the distance in which material travels between the pickup and the bale forming chamber reduces potential negative affects. These negative affects include the potential for undesirable movement, like material being affected by strong cross winds, and damage caused to the crop, an example being leaf loss for alfalfa. For variable chamber balers this relationship is more critical as the pickup tines or teeth act on the crop material when beginning to form a small bale, as it begins to be compacted and the bale begins to be formed. The location of the pickup will thus affect the capability of the baler to properly start forming a bale.

The location of the pickup header relative to the baler wheels is also important because the wheel/tire diameter is fairly constant. If the header is close to the baler wheels then the baler wheels will assist to control the ground clearance of the pickup tines. In balers where the header is located a significant distance from the baler wheels, the pickup header typically has separate gauge wheels to control the ground clearance.

Many models of balers are available that include a pickup header that is wider than the bale forming chamber. In many of these currently available machines there is a feeding device between the pickup and the inlet to the baler, an example of which can be seen in U.S. Pat. No. 6,314,708. This feeder has been found to be necessary to achieve desired feeding capacity, and to provide the necessary feeding force to achieve desirable performance. However, this extra component causes the pickup to be moved relative to the baler wheels, causing more difficult control of the ground clearance of the pickup header. It also requires an additional drive system with the associated cost and complexity.

A wide pickup header for a large round baler is disclosed in European Patent #0064112 in which short augers, one on each side of the pickup header, direct the forage into the center so it can enter the bale-forming chamber of the baler.

In various locations on the pickup header, teeth or tines of varying rigidity are advantageous, enhancing the pickup and delivery of the forage material to the processing portions of the harvesting equipment. A round baler having stiff teeth is disclosed in U.S. Pat. No. 5,394,682. Indications in this patent are that the use of stiffer than usual teeth at the outside ends of the pickup header improves pickup and delivery of the forage to the round baler.

There is, therefore, a need for a method and apparatus for providing for a wide pickup header for forage harvesting that does not require that the header be relocated away from the wheels of the harvesting equipment. There is a further need for a variety of teeth to be used across the width of the header.

SUMMARY OF THE INVENTION

A broad objective of the present invention is for a reliable method and apparatus for providing a pickup header on harvesting equipment that is wider than the harvesting equipment and does not require a secondary feed mechanism. Along with this objective is the purpose to provide a lateral feed system that provides the feeding force to direct the crop material perpendicular to the windrow toward the center of the pickup header. It is a further purpose of the invention to enhance the pickup and delivery of forage with a pickup header by varying the characteristics of the teeth or tines on the pickup header.

According to the present invention there is provided a pickup header assembly for a crop processing machine that is capable of picking-up crop material from a windrow of a width less than or equal to that of the pickup header and delivering the material to processing elements that are narrower than the width of the pickup.

A lateral feed system is disclosed that comprises a pair of augers at each end of the pickup header. In each pair of augers, one auger is positioned vertically over the other. In each pair, the rotational speeds are different. The pairs of augers provide the force required to move the forage toward the center of the pickup header and, ultimately, into the processing portion of the harvesting equipment, such as the bale-forming chamber of a large round baler. The lateral feed system does not require that the pickup header be moved relative to the bale forming chamber, as compared to its position with a pickup header that is not wider than the bale forming chamber. Special consideration is required to assure that the lateral feed system does not clog with forage during operation. Individual characteristics for the tines or teeth within the pickup header are chosen based on the special needs for the location in the pickup header at which they will be installed. Each type of pickup tooth or tine has a specific function that is tailored to provide the capability for the pickup header to lift crop material from the ground, feed it to the bale forming chamber and to allow the material to move perpendicular to the windrow into alignment with the bale forming chamber. Important characteristics comprise angle compared to a plane passing through the axis of rotation of the pickup and rigidity or stiffness.

BRIEF DESCRIPTION OF THE DRAWINGS

FIG. 5a is a schematic of the chain drive system to left side of the pickup header of the present invention;

BEST MODE FOR CARRYING OUT THE INVENTION

Figure 1:
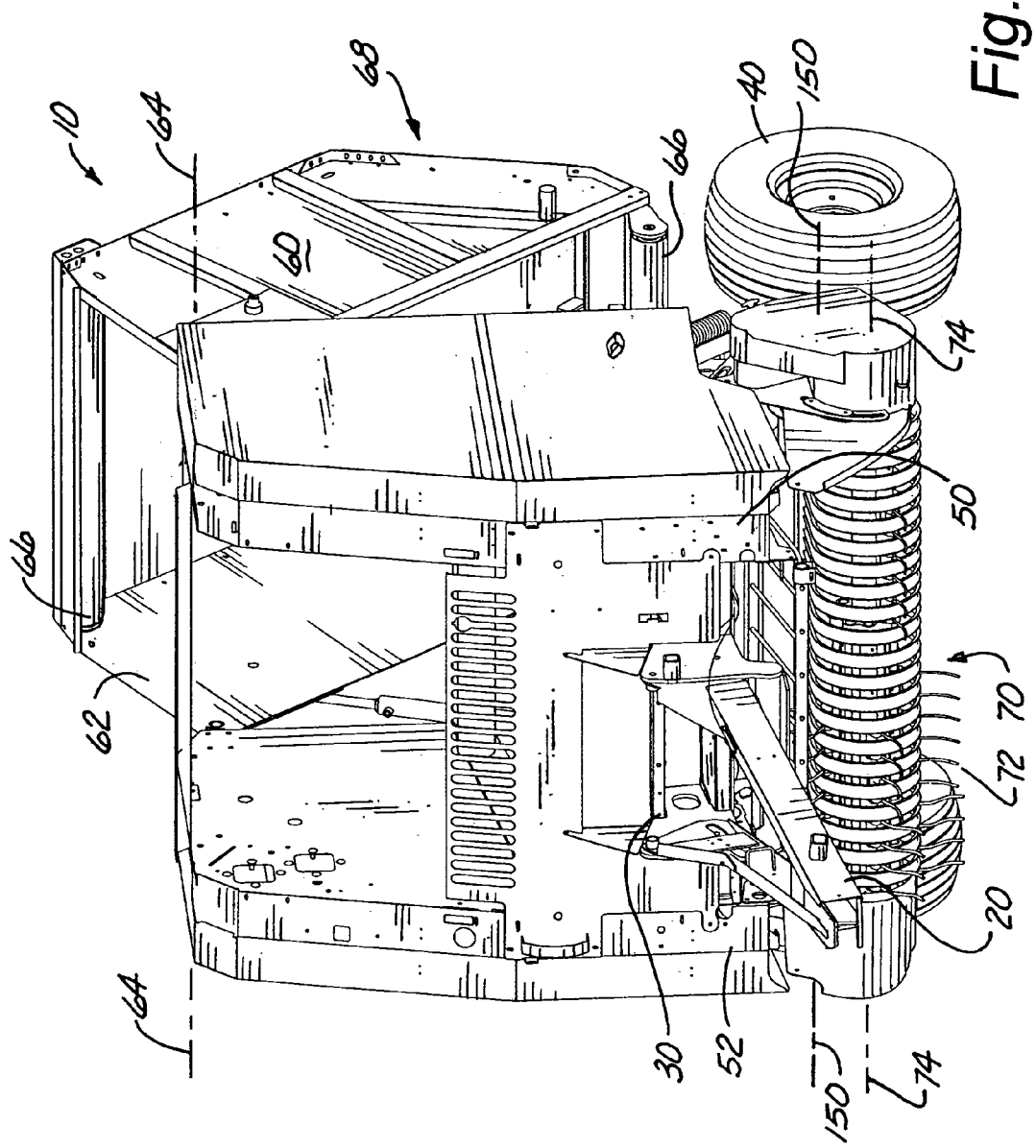
FIG. 1 is a perspective view of the round baler including a pickup attachment of the present invention.

Referring now to the drawings, like reference numerals designate identical or corresponding parts throughout the several views. The included drawings reflect the current preferred and alternate embodiments. There are many additional embodiments that may utilize the present invention. The drawings are not meant to include all such possible embodiments.

Figure 2A:
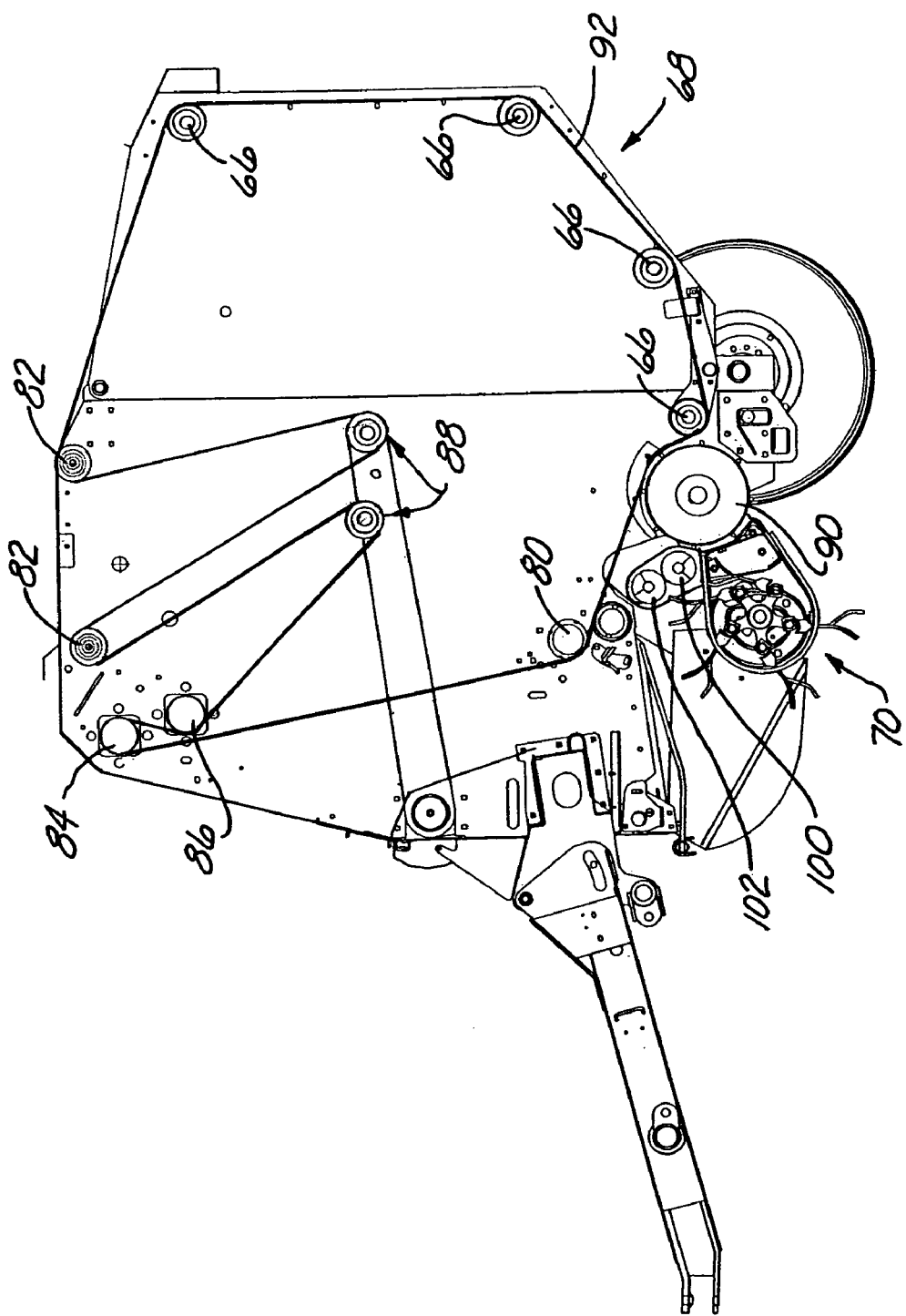
FIG. 2a is an elevational view of the left side of an empty baler with the left side removed, and showing the pickup of the present invention.
Figure 2B:
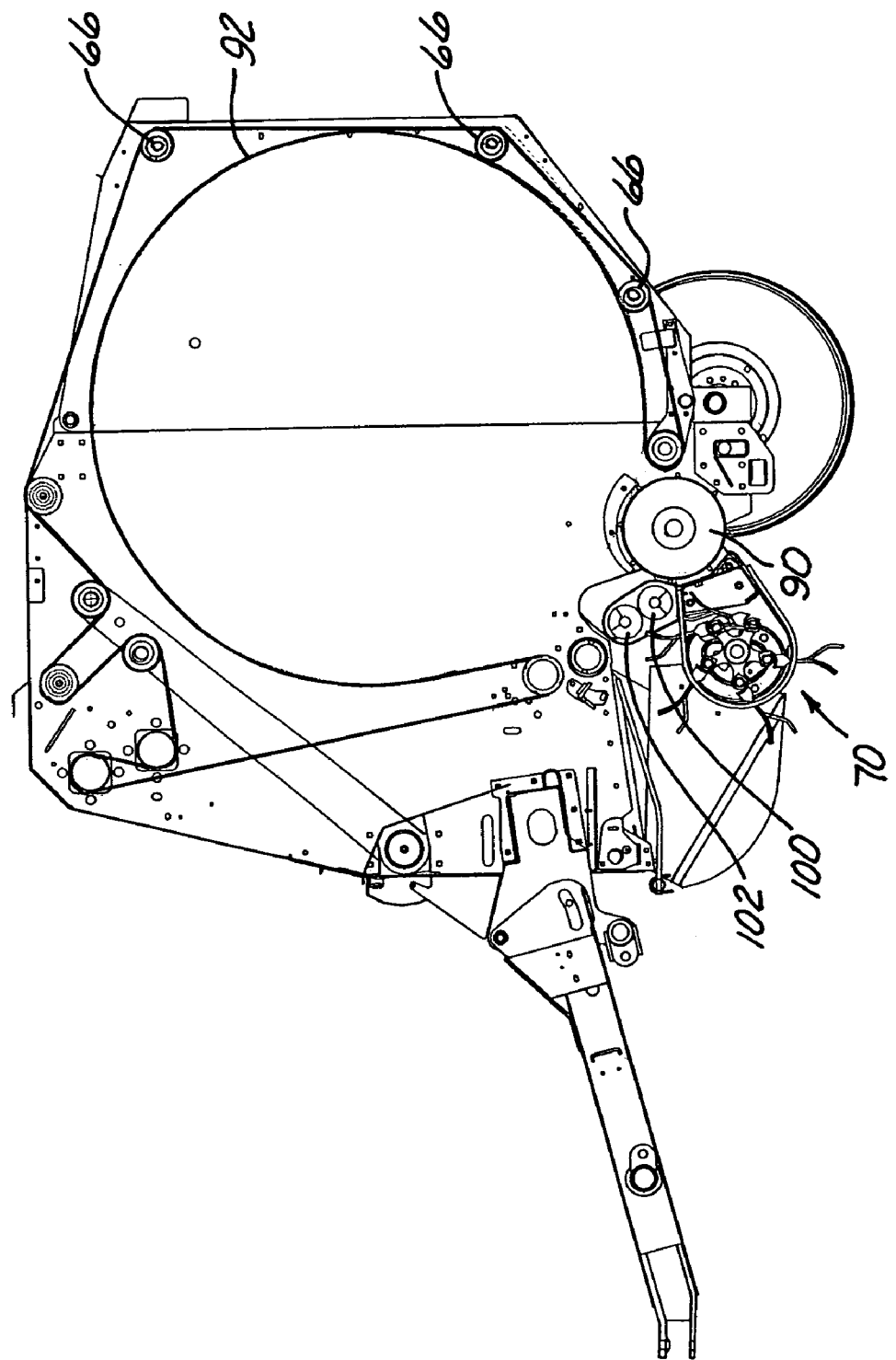
FIG. 2b is an elevational view of the left side of a baler with the left side removed, configured as with a completed bale, and showing the pickup of the present invention.

Shown in FIGS. 1, 2a and 2b is a baler 10 of the type for forming large cylindrical bales of crop material, typically known as a variable chamber large round baler. The baler 10 comprises a tongue 20 adapted to connect to a towing vehicle at a front end and to attach to a tongue beam 30 on the opposite end. The tongue beam 30 typically defines the width of a bale chamber by positioning a left baler side 50, and a right baler side 52. The distance between the sides is the effective width of the bale forming chamber.

The baler sides 50, 52 are operably attached at the front to the tongue beam 30 while being attached at the bottom of the opposite end to an axle (not illustrated). Wheels 40, which define the positions of the side panels 50 and 52 from the ground, support the axle.

A pickup header 70 is typically pivotally attached at a pickup header pivot axis 150 to the baler sides 50 and 52 in the vicinity of the wheels 40. The pickup header includes teeth or tines 72 that are rotated about a pickup header axis 74. The teeth 72 are effective at engaging the crop material to lift it to the bale forming chamber. The pivotal mounting of the pickup header 70 allows it to move independently of the other components of the baler, so that it is able to follow the contour of the ground and maintain a consistent ground clearance. The teeth 72 are typically at their lowest point at a line that is parallel to and generally directly below the pickup header axis 74. This is preferably kept close to the wheel 40 so that the relative movement between the pickup 70 and baler sides 50 and 52, as necessitated by variations in topography will be minimized. If the axis of rotation of the wheels 40 could be coincident with the pickup header rotational axis 74, the relative movement would be very limited. As the pickup rotational axis 74 moves further from the axis of rotation of the wheels 40, then the relative movement becomes more critical, to the point that, in some instances, separate wheels are attached near the pickup rotational axis 74, known as gauge wheels.

A pair of tailgate sides, a left tailgate side 60 and a right tailgate side 62, are pivotally attached to the baler sides 50 and 52 near the top, at a tailgate pivot axis 64. The tailgate panels 60, 62 are connected with a variety of components including idler rollers 66 to form a tailgate 68. With the tailgate in the closed position, as shown in FIGS. 2a and 2b, the bale forming chamber is defined. The tailgate can be raised, by pivoting around the tailgate pivot axis 64, to a raised position where a formed bale can be ejected from the baler.

The sides of the bale forming chamber are defined, with the tailgate 68 in its closed position, by the baler sides 50 and 52 and the tailgate sides 60 and 62. The circumference of the bale forming chamber is defined by a a plurality belts 92 which are routed around idler rollers 66 in the tailgate, a lower drive roller 80, idler roller 82, upper drive rollers 84 and 86 and belt tightener rollers 88. The bottom of the bale forming chamber is defined by a drum roller 90. Comparing FIG. 2a, in the configuration with an empty bale chamber, with FIG. 2b, in the configuration with a full bale, it can be seen how the bale forming chamber varies in size allowing a bale to grow.

With the baler empty as in FIG. 2a, the bale forming chamber is defined in part by the pickup header 70 and pickup tines or teeth 72. Thus the position of the pickup header 70 relative to the bale forming belts 92 and lower drum 90 has an effect on the ability of the baler 10 to start a bale, a critical stage of the formation of a bale. As a windrow of crop material enters an empty baler 10 it will fill the void defined by the sides, the lower drum roller 90, the belts 92 and the pickup header 70. At some point the movements of these components, along with the pickup teeth 72, will force that loose forage material to begin to rotate and form a cylindrical bale. The interaction of the components is necessary to initiate this rolling action.

The present invention involves a wide pickup header 70 that replaces a standard pickup header. A standard pickup header is the same width as the bale-forming chamber, the sides of the pickup header are effectively in-line with the baler sides, so the standard pickup header is only able to lift crop material that is positioned within that area. In this standard configuration the material is exclusively moved, by the pickup header 70, in a direction substantially parallel to the windrow.

Figure 3A:
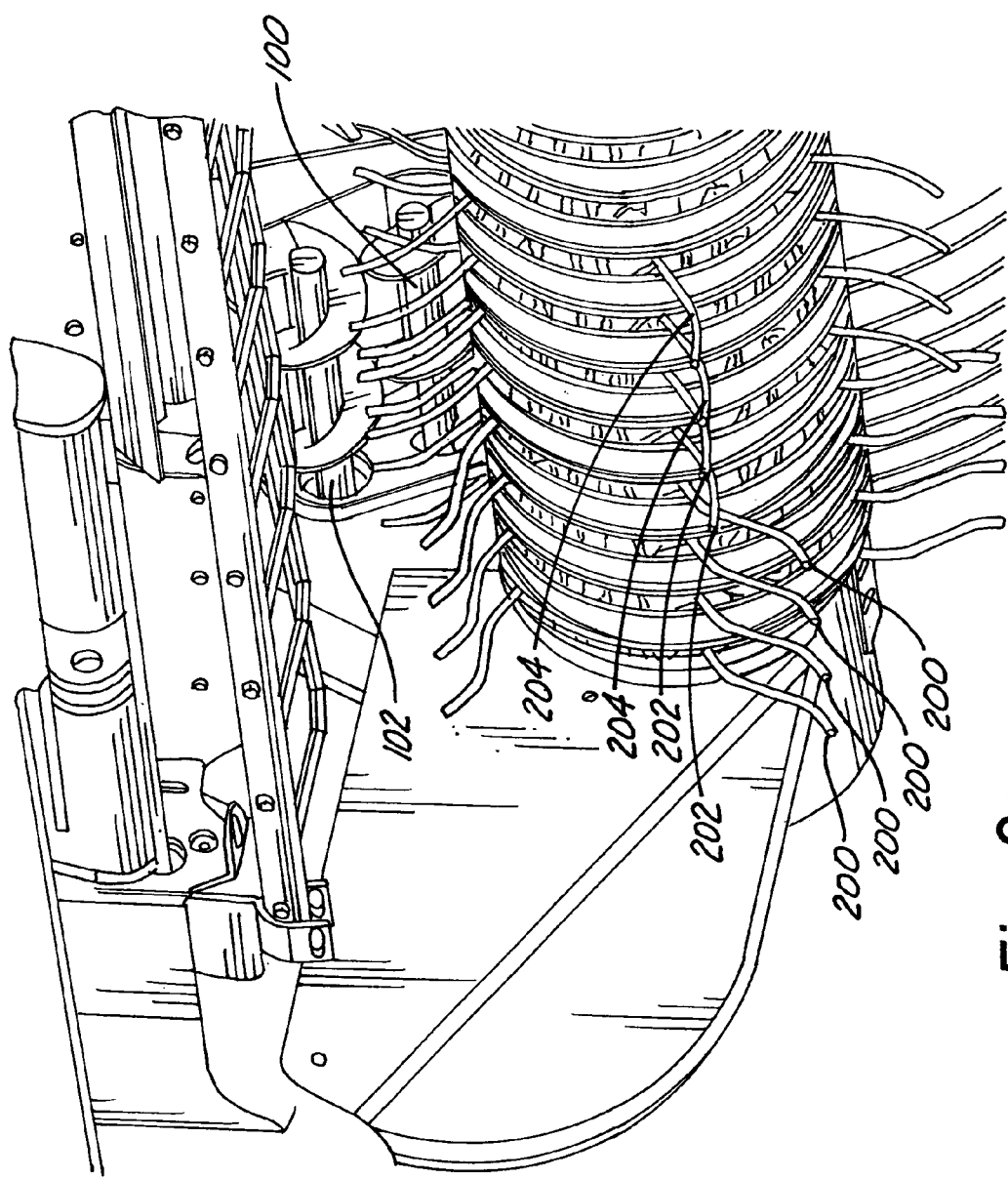
FIG. 3a is a perspective view of a portion of the pickup with teeth of the present invention.
Figure 3B:
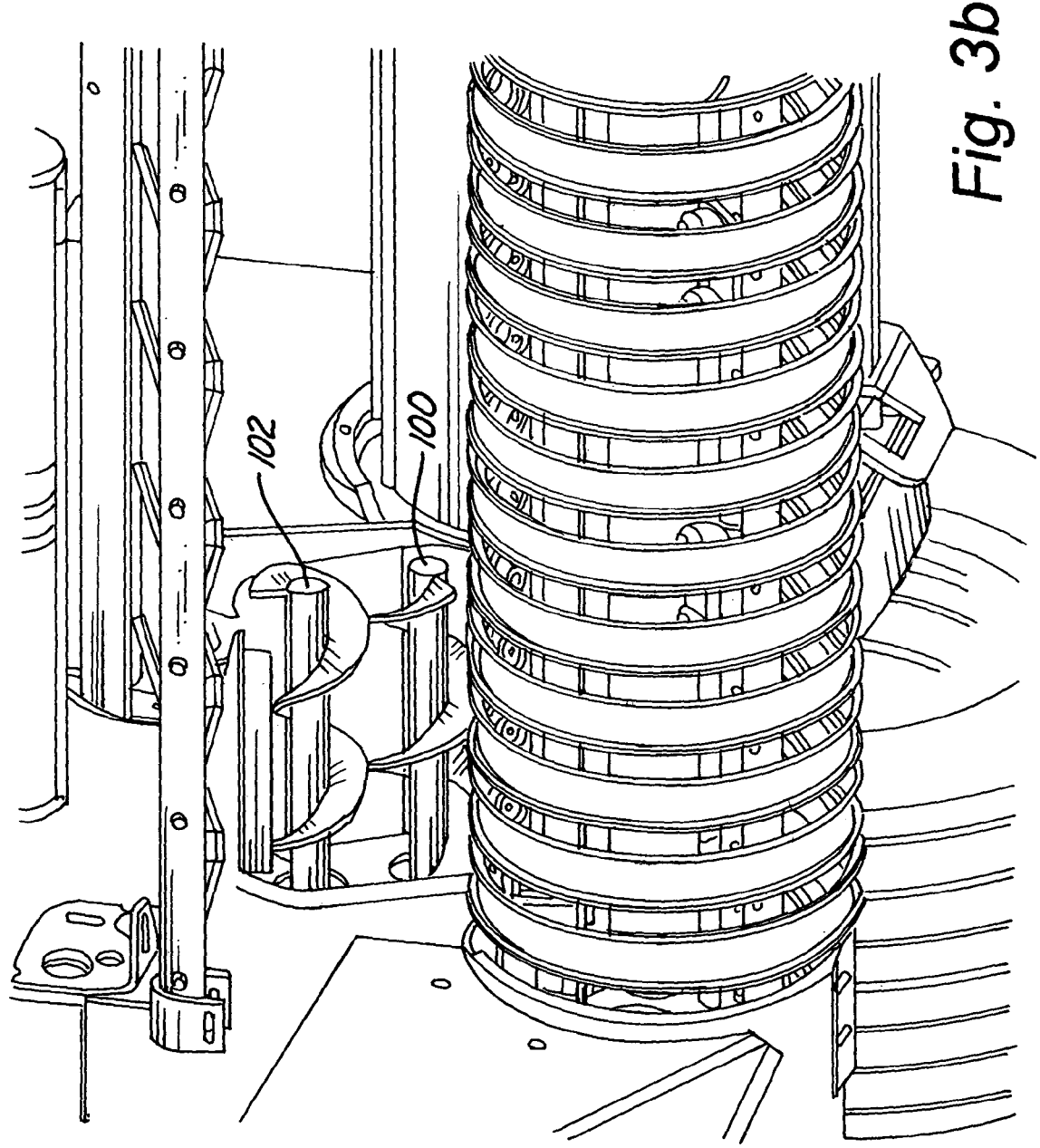
FIG. 3b is a perspective view of a portion of the pickup without teeth of the present invention.
Figure 4:
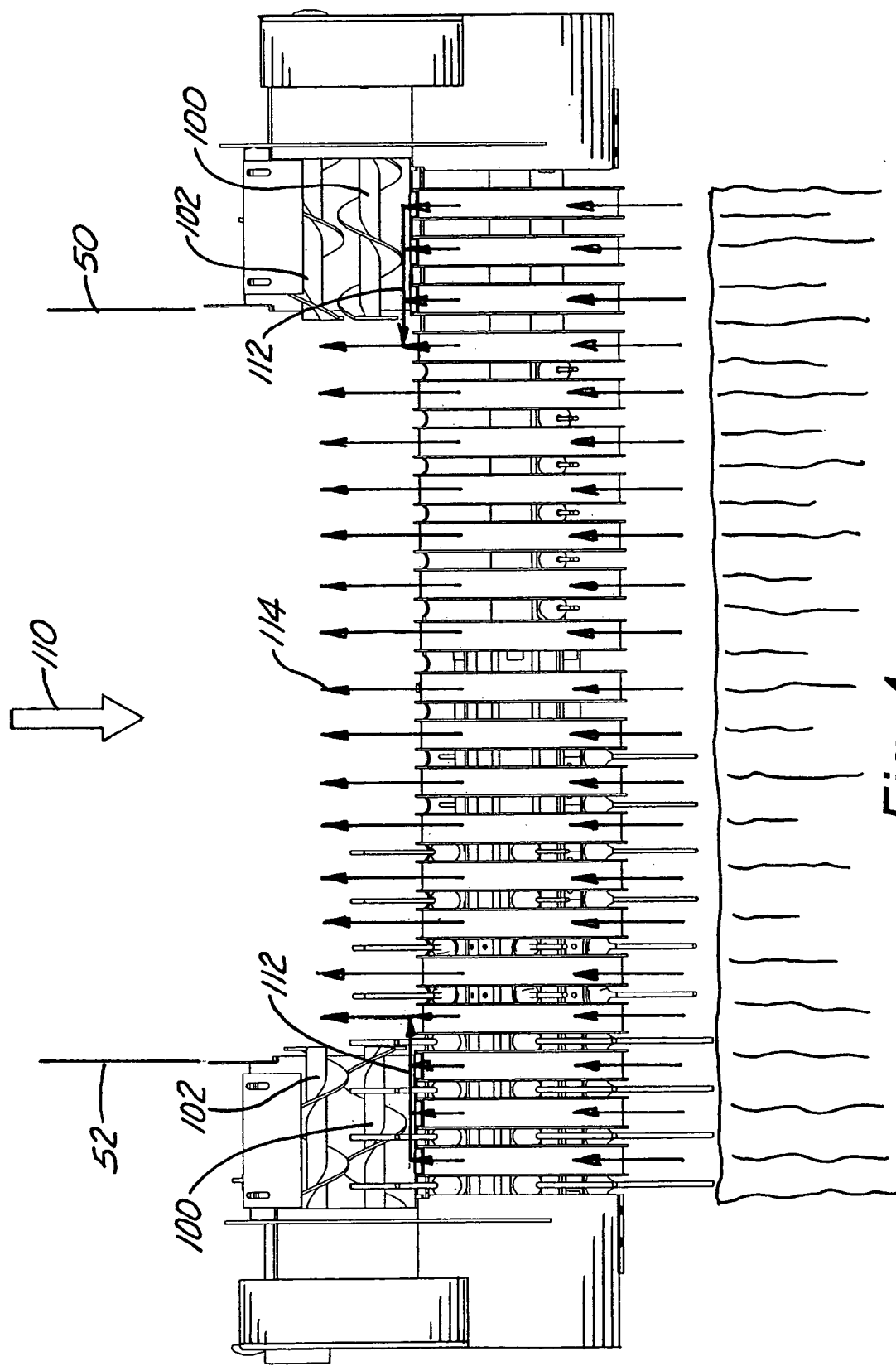
FIG. 4 is a plan view of the pickup of the present invention, showing the crop flow from a windrow wider than the processing elements to the bale forming chamber.

The wide pickup header 70 of the present invention is notably wider than the bale-forming chamber of the baler and includes the addition of feed components to move a portion of the material in a direction having a component that is perpendicular to the windrow. That portion is the material that initially resides outside the edge of the bale-forming chamber. The aforementioned feed components are pairs of augers 100, 102 on both the left and right sides of the pickup header 70 in the transition zone between the pickup and the bale forming chamber. The pair of augers 100, 102 on the right side of the baler are illustrated in FIGS. 3a and 3b. These augers 100, 102 are positioned to move crop material that is outside the width of the bale forming chamber in a direction 112 (see FIG. 4), having a component that is perpendicular to both the direction of travel 110 of the baler, and the direction of travel 114 of the crop material between the baler sides 50, 52, as illustrated in FIG. 4. This allows the pickup header 70 to gather crop materials that are outside the region that a standard pickup header would be effective.

With the arrangement of the present invention the wide pickup header 70 can be positioned forward and aft, relative to the wheels, in substantially the same position as a standard pickup header; due in part to the physical location of and drive arrangement to the feed augers 100, 102.

FIGS. 2a and 2b illustrate the position of the augers 100, 102, just behind the pickup header 70 and in front of the lower drum roller 90. The augers can be positioned in this area, without forcing the pickup header 70 to be moved, as a result of the physical arrangement of placing one on top of the other. The small diameter of the augers 100, 102 results in a small horizontal space requirement.

It has been found that the capacity of an auger to move material in this area is affected by the height of the auger, that is, its vertical dimension. With this stacked arrangement the effective vertical dimension of the auger assembly is sufficient to provide acceptable capacity.

Figure 5B:
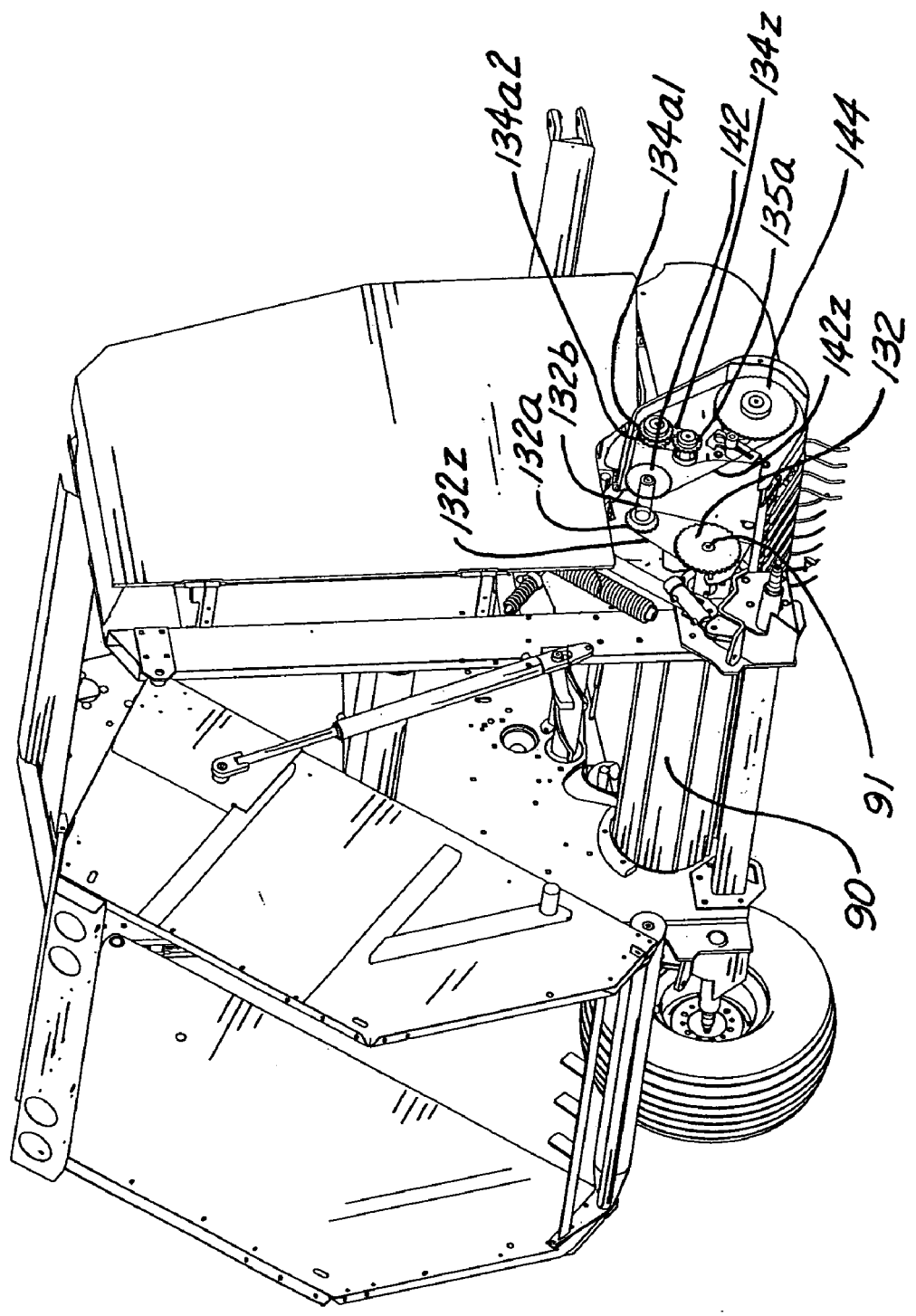
FIG. 5b is a perspective view of the chain drive system to the right side of the pickup header of the present invention.

The performance of the auger pairs 100, 102 is further affected by the drive arrangement. The drive arrangement is illustrated in FIGS. 5a–5b. FIG. 5a illustrates a main chain drive 120, located relatively close to the baler's left side 50, including a first drive sprocket 122 driving a chain that is also looped around a first driven sprocket 500 on the lower drive roller 80 (see FIG. 2a) and a second chain drive, driven from a second drive sprocket 510, which is also mounted on the lower drive roller 80 to a second driven sprocket 124 on the drum roller. The power is transferred through the drum roller to a sprocket 132 on the right side 52 of the baler 10 as shown in FIG. 5b. A chain 132z, on the right side 52, is driven by the sprocket 132 and drives a sprocket 132a which is supported by and rotates with a stub shaft 132b. A stub-shaft sprocket 142 is mounted on and rotates with the stub shaft 132b. A second chain 142z, also on the right side, is driven by the stub-shaft sprocket 142, and drives the auger sprocket 134a1, which turns the upper auger 102, as well as the pickup sprocket 144. A third chain 134z, on the right side, is driven by a second auger sprocket 134a2, mounted on the upper auger 102, and drives auger sprocket 135a, which drives the lower auger 100.

The power is, again, passed through the baler 10 through the pickup drive shaft to a third chain drive on the left side (see FIG. 5a), powered by a drive sprocket 520 on the pickup header, this third chain drive powers the two auger sprockets 134b and 135b. The auger drive sprockets 134b and 135b comprise a different number of teeth, such that the two augers 100 and 102 on the left side rotate at slightly different speeds, which results in relative movement between the outer surfaces of the two augers. Likewise, the auger drive sprockets 134a2 and 135a comprise a different number of teeth, such that the two augers 100 and 102 on the right side rotate at slightly different speeds, which also results in relative movement between the outer surfaces of these two augers. This relative movement prevents material from building up between or wrapping around the augers since the augers scrape against each other in this relationship. This same effect could be accomplished by the use of augers of different diameters turning at the same speed.

Another critical feature for proper performance is the interaction between the pickup teeth 72 and the augers 100, 102. The pickup header 70 of the present invention utilizes different styles of pickup teeth, as illustrated in FIG. 3a. The three styles are illustrated as a laid-back tooth 200 used in the regions in which the teeth pass under the augers 100, 102; a heavy tooth 202 that is positioned directly beyond the end of the augers toward the inside; and a standard tooth 204 positioned in the middle of the pickup header 70.

Figure 6:
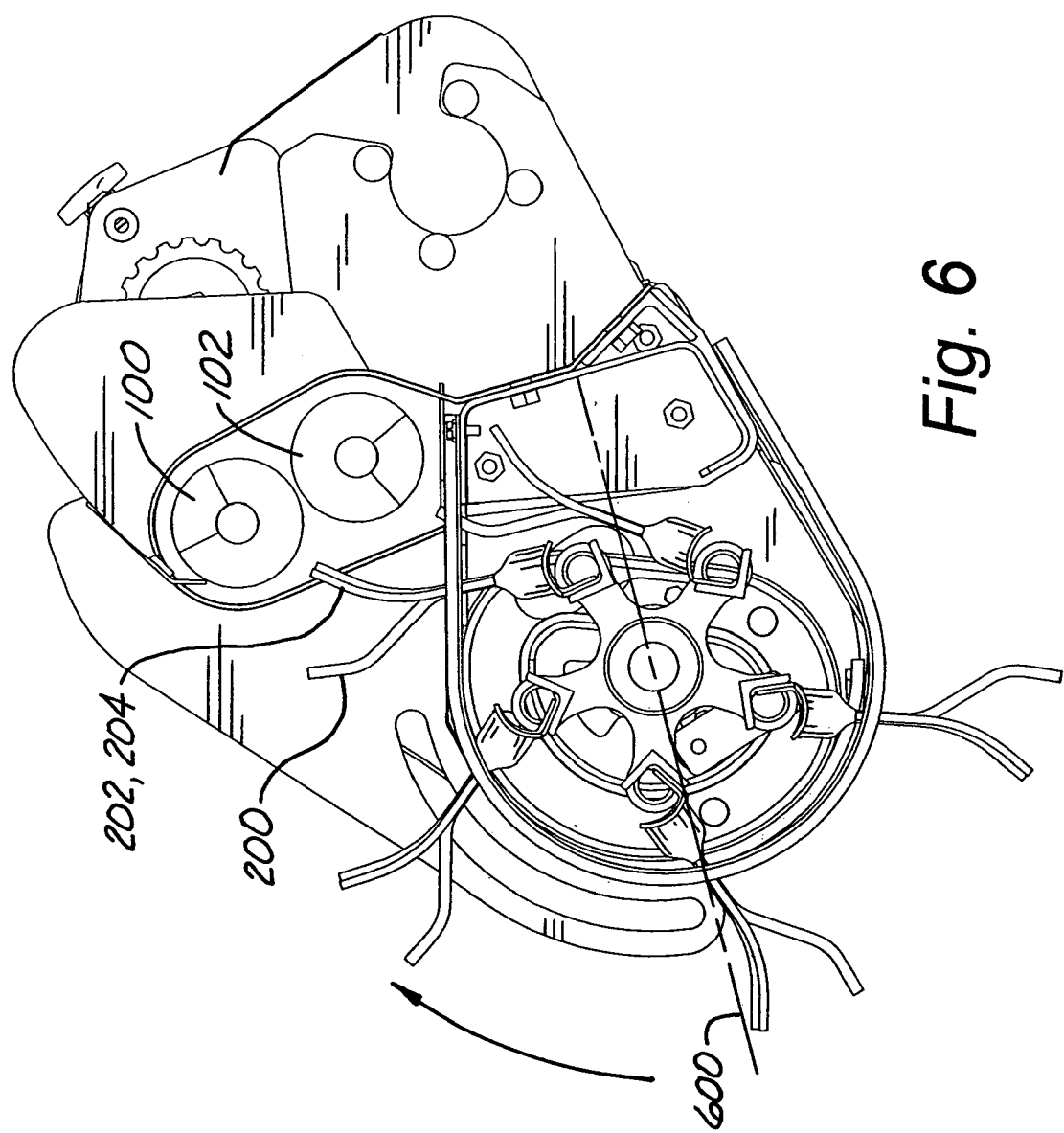
FIG. 6 is a schematic illustrating the orientation of the pickup teeth.

The configuration of the teeth 72 is illustrated in FIGS. 3a and 6, with the laid-back teeth 200 tilted in the direction opposite that of rotation 74 when compared to the other teeth 202, 204, or delayed. An angle between a plane passing through the axis of rotation of the pickup header and a laid back tooth's 200 base is greater than the other teeth 202, 204. This feature allows the teeth 200 to engage the material on the ground and deliver it to the augers 100, 102 while allowing sufficient clearance for the augers 100, 102 to move the material in a lateral direction 112 towards the bale forming chamber.

Heavy teeth 202 are positioned at the end of the augers 100, 102, just to the inside of the baler sides 50, 52. These teeth are substantially more rigid than standard teeth 204, and their performance tends to increase in a wider variety of crop conditions with increasing stiffness. However, the ability of the heavy teeth 202 to survive excessive deflection that is unavoidable in the event of contact with the ground, or something on the ground, or an object plugging the baler inlet tends to decrease with increasing stiffness. It has been found that a heavy tooth 202 that requires a minimum force of 45 $lb_f$ applied to its tip in order to cause a deflection of 41° provides acceptable performance and acceptable durability. It is recognized that a stiffer tooth in this position would further enhance performance, if a material or tooth design could be identified that provided acceptable durability.

Standard teeth 204 are positioned between the heavy teeth 202, and require a force of approximately 15 lbf at their tip to deflect 41°. Typically the standard teeth 204 are capable of withstanding a greater number of cycles of extreme deflection, than the heavy teeth 202. The middle of the pickup header 70 is more likely to encounter deviations in the topography not encountered by the wheels, than the sides of the pickup header 70. Thus, the teeth mounted on the sides will experience fewer events of extreme deflection. This fact at least partially provides the possibility of acceptable tooth longevity while utilizing the heavy teeth 202 in the position illustrated, as it is likely that they will experience fewer cycles of extreme deflection as the result of contact with extreme deviations in the ground conditions.

The heavy teeth 202 are required at the illustrated position to provide extra feeding force to take the material being moved by the augers 100, 102 and push that material into the bale forming chamber.

Several combinations of these various styles of teeth 200, 202, 204 are possible, and may be utilized to provide an optimum configuration for a variety of crop conditions. For instance, in some crops, heavy teeth 202 may not be necessary. In this instance the standard teeth 204 may be installed in the positions where the heavy teeth 202 are illustrated. It is also possible that in some conditions it may be desirable to use heavy teeth 202 wherever the standard teeth 204 are illustrated.

The above embodiments are the preferred embodiments, but this invention is not limited thereto. It is, therefore, apparent that many modifications and variations of the present invention are possible in light of the above teachings. It is, therefore, to be understood that within the scope of the appended claims, the invention may be practiced otherwise than as specifically described.

We claim:

1. A method for harvesting forage crops with a harvester comprising a processing unit and a pickup header, the pickup header including at least one pair of augers situated one above another, the at least one pair of augers being on at least one side of the pickup unit and rotating on axes substantially parallel to a pickup header axis, the pickup header being wider than a width of the processing unit, the method comprising:

(a) picking up the forage crop with the pickup header having teeth with which to move the forage crop;

(b) transferring the forage crop towards the processing unit with the teeth in a direction substantially perpendicular to the pickup header axis;

(c) directing the forage crop in the pickup header outside the width of the processing unit toward a middle of the pickup header with the at least one pair of augers on at least one side of the pickup unit, shafts of said at least one pair of augers not extending across a full width of the pickup header; and (d) driving individual augers within one pair of augers such that respective tangential speeds at an outer circumference of each of said individual augers are unequal.

2. The method of claim 1, additionally comprising:

(a) using a laid back tooth having an angle measured between itself and a radial line passing through the pickup header axis and a base of the laid back tooth greater than teeth in the pickup header not sweeping under the at least one pair of augers; and (b) rotating said laid back tooth only about the pickup header axis.

3. The method of claim 2 wherein the laid back teeth are used in a region of the pickup header that sweeps under the at least one pair of augers.

4. The method of claim 1, additionally comprising:

(a) using a heavy tooth having a rigidity such that a force of at least 45 $lb_f$ is required to deflect said heavy tooth an angle of 41°; and (b) rotating said heavy tooth only about the pickup header axis.

5. The method of claim 4 wherein the heavy teeth are used in a region of the pickup header inside ends of the at least one pair of augers.

6. The method of claim 1, additionally comprising using teeth having a plurality of characteristics comprising:

(a) a laid back tooth having an angle measured between itself and a radial line passing through the pickup header axis and a base of the laid back tooth greater than teeth having other characteristics in the pickup header; and (b) a heavy tooth having a rigidity such that a force of at least 45 $lb_f$ is required to deflect said heavy tooth an angle of 41°;

wherein the method also comprises rotating said teeth only about the pickup header axis.

7. The method of claim 1 wherein a rotational speed of one auger of the at least one pair of augers is not the same value as a rotational speed of the other auger.

8. The method of claim 1 additionally comprising the step of locating said pickup header at a position in close proximity to an axis of rotation of a wheel, such that the pickup header is not supported by gauge wheels.

9. An apparatus for crop processing having a processing width defined by a distance between a left side and a right side of a processing unit, the apparatus comprising:

(a) a pickup header that is wider than said processing width;

(b) teeth incorporated with the pickup header to actively move the crop;

(c) a pair of augers on at least one of a right side and a left side of the pickup header to move crop material laterally, shafts of said pair of augers not extending across a full width of the pickup header; and (d) an auger pair drive system for driving said augers such that tangential speeds of outer circumferences of respective augers within the pair of augers are unequal.

10. The apparatus of claim 9 additionally comprising teeth in the pickup header, said teeth comprising at least one laid back tooth having an angle measured between itself and a radial line passing through the pickup header axis and a base of the at least one laid back tooth greater than teeth in the pickup header not sweeping under the pair of augers; further, said teeth are rotated about and axis of the pickup header only.

11. The apparatus of claim 10 wherein the laid back teeth are used in a region of the pickup header that sweeps under the at least one pair of augers.

12. The apparatus of claim 9 additionally comprising teeth in the pickup header, said teeth comprising at least one heavy tooth having a rigidity such that a force of at least 45 $lb_f$ is required to deflect said at least one heavy tooth an angle of 41°.

13. The apparatus of claim 12 wherein at least one heavy tooth is used in a region of the pickup header inside ends of the at least one pair of augers.

14. The apparatus of claim 9, the pickup header additionally comprising teeth comprising:

(a) a laid back tooth having an angle measured between itself and a radial line passing through the pickup header axis and a base of the laid back tooth greater than teeth having other characteristics in the pickup header; and (b) a heavy tooth having a rigidity such that a force of at least 45 $lb_f$ is required to deflect said heavy tooth an angle of 41°.

15. The apparatus of claim 9 additionally comprising means to make a rotational speed of one auger of the at least one pair of augers different from a rotational speed of the other auger.

16. The apparatus of claim 9 wherein said pickup header is not supported by gauge wheels.

17. The apparatus of claim 9 wherein the apparatus for crop processing is a large round baler.

* * * * *